United States Patent [19]

Lekron

[11] Patent Number: 4,862,345
[45] Date of Patent: Aug. 29, 1989

[54] PROCESS PLANT INSTRUMENTATION DESIGN SYSTEM

[75] Inventor: Charles E. Lekron, Houston, Tex.

[73] Assignee: Litwin Engineers & Constructors, Inc., Houston, Tex.

[21] Appl. No.: 120,609

[22] Filed: Nov. 16, 1987

[51] Int. Cl.⁴ .............................................. G06F 15/46
[52] U.S. Cl. ................................. 364/188; 364/138; 364/192; 364/900; 364/917.96
[58] Field of Search ............... 364/513, 512, 188, 189, 364/200, 900, 500, 578, 191-193, 138, 139

[56]       References Cited
        U.S. PATENT DOCUMENTS

| 4,275,449 | 6/1981 | Aish | 364/512 |
| 4,303,973 | 12/1981 | Williamson, Jr. et al. | 364/189 |
| 4,443,861 | 4/1984 | Slater | 364/189 |
| 4,451,895 | 5/1984 | Sliwkowski | 364/188 |
| 4,570,217 | 2/1986 | Allen et al. | 364/188 |
| 4,663,704 | 5/1987 | Jones et al. | 364/138 |
| 4,700,317 | 10/1987 | Watanabe et al. | 364/512 |

Primary Examiner—Joseph Ruggiero
Attorney, Agent, or Firm—Vaden, Eickenroht, Thompson & Boulware

[57] ABSTRACT

An improved process plant instrumentation design system is disclosed in which the amount of data that must be input is greatly reduced by using default information whenever possible. The system also automatically generates the instrumentation loop drawing using the imputted and default information and a program to create the loops. The loop is automatically drawn using a computer-aided design (CAD) program.

14 Claims, 7 Drawing Sheets

FIG. 2A

INSTRUMENT DATA SHEET
D/P CELL TRANSMITTERS

CLIENT: ABC REFINING CO.          LITWIN ENGINEERS & CONSTRUCTORS, INC.
PROJECT: CRUDE UNIT                HOUSTON, TEXAS
UNIT NO: 25                        LITWIN CONTRACT: 8300
LOCATION: ANYWHERE, USA            LITWIN UNIT NO: 1000
APPROVED: _____                   SPEC: 6104  PAGE: 1 OF   REV: 0
                                   BY: C. LEKRON  DATE: 10/14/87
                                   CHKD: _____  DATE: _____

MANUFACTURER: ACME MFGR.  TYPE: ELECTRONIC  OUTPUT: 4-20ma  INTRINSIC SAFE: Y  REMOTE SEAL: NO

| TAG NUMBER | CALIBRATED RANGE | BODY MATERIAL | ELEMENT MATERIAL | MOUNTING TYPE | AREA CLASSIFICATION | MODEL | NOTES | REV |
|---|---|---|---|---|---|---|---|---|
| 25-FT-0001 | 0-100"H2O | CAD/PL CS | 304 SS | 2"PIPESTND | CL-1,GP-D,DIV-2 | 1151DP | 1,2,3 | 0 |

FIG. 2B

INSTRUMENT DATA SHEET
D/P CELL TRANSMITTERS

CLIENT: ABC REFINING CO.          LITWIN ENGINEERS & CONSTRUCTORS, INC.
PROJECT: CRUDE UNIT                HOUSTON, TEXAS
UNIT NO: 25                        LITWIN CONTRACT: 8300
LOCATION: ANYWHERE, USA            LITWIN UNIT NO: 1000
APPROVED: _____                   SPEC: 6104  PAGE: 2 OF   REV: 0
                                   BY: C. LEKRON  DATE: 10/14/87
                                   CHKD: _____  DATE: _____

MANUFACTURER: ACME MFGR.  TYPE: ELECTRONIC  OUTPUT: 4-20ma  INTRINSIC SAFE: Y  REMOTE SEAL: NO

| TAG NUMBER | CALIBRATED RANGE | BODY MATERIAL | ELEMENT MATERIAL | MOUNTING TYPE | AREA CLASSIFICATION | MODEL | NOTES | REV |
|---|---|---|---|---|---|---|---|---|
| 25-FT-0003 | 0-100"H2O | CAD/PL CS | 304 SS | 2"PIPESTND | CL-1,GP-D,DIV-2 | ABCDEFG | 1,2,3 | 0 |

INSTRUMENT DATA SHEET
D/P CELL TRANSMITTERS

CLIENT: ABC REFINING CO.
PROJECT: CRUDE UNIT
UNIT NO: 25
LOCATION: ANYWHERE, USA
APPROVED: _____

LITWIN ENGINEERS & CONSTRUCTORS, INC.
HOUSTON, TEXAS
LITWIN CONTRACT: 8300
LITWIN UNIT NO: 1000
SPEC: 6104    PAGE: 3 OF 3    REV: 0
BY: C. LEKRON    DATE: 10/14/87
CHKD: _____    DATE: _____

FIG. 2C

NOTES FOR D/P CELL TRANSMITTERS

1. EACH TRANSMITTER SHALL HAVE A PERMANENTLY MARKED S.S. NAMEPLATE SHOWING TAG NUMBER.

2. TRANSMITTER SHALL BE ACME MFGR. 1151DP3E1215 WITH ADJUSTABLE RANGE OF 0-5/0-30 IN OF WATER.

3. TRANSMITTER SHALL BE ACME MFGR. 1151DP4E1215 WITH ADJUSTABLE RANGE OF 0-25/0-150 IN OF WATER.

INSTRUMENT INDEX SUMMARY

PAGE: 1 OF 1  
REPORT DATE: 10/14/87  
LITWIN ENGINEERS & CONSTRUCTORS, INC.  
HOUSTON, TEXAS  
CONTRACT: 8300  
UNIT NO: 1000

CLIENT: ABC REFINING CO.  
PROJECT: CRUDE UNIT  
UNIT NO: 25  
LOCATION: ANYWHERE, USA

REV: 0  
BY: C. LEKRON  
APUL: _____

| TAG NUMBER | SERVICE | P&ID | SPEC | P.O. NO. | MFGR. | MODEL NO. | LOOP DWG. | PLAN DWG. | DETAIL | LOCATION | NOTES | REV. | REC. NO. |
|---|---|---|---|---|---|---|---|---|---|---|---|---|---|
| 25-FE -0001 | FUEL GAS TO HEATER H-101 | 25D0001 | 6114 | | ACME MFGR. | 1151DP | 25FC0001 | | | FIELD-IP | | 0 | 1 |
| 25-FT -0001 | FUEL GAS TO HEATER H-101 | 25D0001 | 6104 | | | | 25FC0001 | | | FIELD-IE | | 0 | 2 |
| 25-FI -0001 | FUEL GAS TO HEATER H-101 | 25D0001 | 6191 | | | | 25FC0001 | | | FIELD-IE | | 0 | 3 |
| 25-FY -0001-A/D | FUEL GAS TO HEATER H-101 | 25D0001 | 6480 | | XYZ MFGR. | | 25FC0001 | | | SYSTEM-IE | | 0 | 4 |
| 25-FIC -0001 | FUEL GAS TO HEATER H-101 | 25D0001 | 6480 | | XYZ MFGR. | | 25FC0001 | | | SYSTEM-I | | 0 | 5 |
| 25-FAH -0001 | FUEL GAS TO HEATER H-101 | 25D0001 | 6480 | | XYZ MFGR. | | 25FC0001 | | | SYSTEM-I | | 0 | 6 |
| 25-FAL -0001 | FUEL GAS TO HEATER H-101 | 25D0001 | 6480 | | XYZ MFGR. | | 25FC0001 | | | SYSTEM-I | | 0 | 7 |
| 25-FQI -0001 | FUEL GAS TO HEATER H-101 | 25D0001 | 6480 | | XYZ MFGR. | | 25FC0001 | | | SYSTEM-I | | 0 | 8 |
| 25-FY -0001-D/A | FUEL GAS TO HEATER H-101 | 25D0001 | 6480 | | | | 25FC0001 | | | SYSTEM-IE | | 0 | 9 |
| 25-FY -0001-I/P | FUEL GAS TO HEATER H-101 | 25D0001 | 6240 | | | | 25FC0001 | | | FIELD-IE | | 0 | 10 |
| 25-FV -0001 | FUEL GAS TO HEATER H-101 | 25D0001 | 6210 | | | | 25FC0001 | | | FIELD-IP | | 0 | 11 |
| 25-PT -0002 | FUEL GAS PRESSURE | 25D0001 | 6161 | | | | 25PC0002 | | | FIELD-IE | | 0 | 12 |
| 25-PI -0002 | FUEL GAS PRESSURE | 25D0001 | 6191 | | | | 25PC0002 | | | FIELD-IE | | 0 | 13 |
| 25-PY -0002-A/D | FUEL GAS PRESSURE | 25D0001 | 6480 | | XYZ MFGR. | | 25PC0002 | | | SYSTEM-IE | | 0 | 14 |
| 25-PIC -0002 | FUEL GAS PRESSURE | 25D0001 | 6480 | | XYZ MFGR. | | 25PC0002 | | | SYSTEM-IE | | 0 | 15 |
| 25-PAH -0002 | FUEL GAS PRESSURE | 25D0001 | 6480 | | XYZ MFGR. | | 25PC0002 | | | SYSTEM-I | | 0 | 16 |
| 25-PAL -0002 | FUEL GAS PRESSURE | 25D0001 | 6480 | | XYZ MFGR. | | 25PC0002 | | | SYSTEM-I | | 0 | 17 |
| 25-PY -0002-D/A | FUEL GAS PRESSURE | 25D0001 | 6480 | | XYZ MFGR. | | 25PC0002 | | | SYSTEM-IE | | 0 | 18 |
| 25-PY -0002-I/P | FUEL GAS PRESSURE | 25D0001 | 6240 | | | | 25PC0002 | | | FIELD-IE | | 0 | 19 |
| 25-PV -0002 | FUEL GAS PRESSURE | 25D0001 | 6210 | | | | 25PC0002 | | | FIELD-IP | | 0 | 20 |
| 25-FE -0003 | WATER FLOW TO BOILER | 25D0002 | 6114 | | QUALTY MFGR. | ABCDE | 25FC0003 | | | FIELD-IP | | 0 | 21 |
| 25-FT -0003 | WATER FLOW TO BOILER | 25D0002 | 6104 | | | FG | 25FC0003 | | | FIELD-IE | | 0 | 22 |
| 25-FI -0003 | WATER FLOW TO BOILER | 25D0002 | 6191 | | | | 25FC0003 | | | FIELD-IE | | 0 | 23 |
| 25-FY -0003-A/D | WATER FLOW TO BOILER | 25D0002 | 6480 | | | | 25FC0003 | | | SYSTEM-IE | | 0 | 24 |
| 25-FIC -0003 | WATER FLOW TO BOILER | 25D0002 | 6480 | | | | 25FC0003 | | | SYSTEM-I | | 0 | 25 |
| 25-FAH -0003 | WATER FLOW TO BOILER | 25D0002 | 6480 | | | | 25FC0003 | | | SYSTEM-I | | 0 | 26 |
| 25-FAL -0003 | WATER FLOW TO BOILER | 25D0002 | 6480 | | | | 25FC0003 | | | SYSTEM-I | | 0 | 27 |
| 25-FY -0003-D/A | WATER FLOW TO BOILER | 25D0002 | 6480 | | | | 25FC0003 | | | SYSTEM-IE | | 0 | 28 |
| 25-FY -0003-I/P | WATER FLOW TO BOILER | 25D0002 | 6240 | | | | 25FC0003 | | | FIELD-IE | | 0 | 29 |
| 25-FV -0003 | WATER FLOW TO BOILER | 25D0002 | 6210 | | | | 25FC0003 | | | FIELD-IP | | 0 | 30 |

FIG. 3

PROCESS PLANT INSTRUMENTATION DESIGN SYSTEM

FIELD OF THE INVENTION

This invention relates to the design of instrumentation systems used to operate and control process plants, including but not limited to oil refineries, petrochemical, and food processing plants.

BACKGROUND OF THE INVENTION

Processing plants typically include a series of operations in which liquid, gas, and solid materials are transported, heated, mixed, chemically treated, cooled, pressurized or otherwise processed. The different processes may be classified into the following types: flow, level pressure, temperature, mechanical, or analytical.

Each of such operations must generally be monitored and controlled to ensure that it is being properly performed according to some predetermined specifications or criteria. This monitoring and controlling typically requires instrumentation consisting of gauges or sensors to sense a present condition, a transmitter for transmitting the sensed data, a computer or other decision maker that receives the sensed data and decides whether an adjustment is needed, wiring or junction boxes to connect the components, and a valve that responds to the computer to make the adjustment. Alarms are also desirable in some situations to warn of high and low conditions.

Each of these sensor-transmitter-computer-valve combinations is called an instrument "loop". A typical petrochemical process plant may have hundreds of instrument loops.

A loop may be classified by the type of process it controls (flow, level, pressure, etc.) and also by the classes of components used in the loop. Some component types include electronic, pneumatic, and mechanical.

Loops may also be classified by the location of the decision-making computer. A "board" loop is one where the transmitter sends the sensed data to a central control computer or board. A "local" loop is one where a local sensor or field transmitter sends a control signal to a local controller and field valve, without computer intervention. A "local panel" loop is one that sends the signal to a local or field control board unit instead of to a centralized computer.

There are also many different types of components that may be used in such loops. For example, there may be a different transmitter type for each type of process (e.g. flow transmitters, level transmitters, etc.) In addition, each component type has subtypes with differing specifications or manufacturers.

From the above discussion, it is apparent that there are literally thousands of different combinations of loop and component types that may be used in a process plant.

In the past, a unique loop drawing or template was designed and hand-drawn for each loop used in a process plant, requiring many man-hours of work and taking long periods of time. The engineer studied the overall process plant flow diagram (P&ID), chose the instrument loop, and for each loop decided which components were necessary in the loop, specified each component separately on an instrument index, and then hand-drew the loop with its components by referencing the instrument index. The loop drawings were then filed or stored for later use.

The advent of Computer-Aided Design (CAD) programs expedited the creation of the loop drawings by enabling the operator to instruct the computer, using a digitizer or mouse, where to place the components and lines on the drawing, and having the computer transfer the component symbols from a symbol library onto the drawing.

Even with a CAD program, however, a unique template must be drawn for each loop, each drawing must be designed by a human designer, a human operator must manipulate the computer to generate a CAD template, and each template must be stored for later use. Many man-hours are still required to generate a loop drawing even when CAD programs are used. After the loop drawing has been created, the text that is to appear on the loop drawing is then transferred onto it.

It is therefore desirable to decrease the number of man-hours required to design and draw the loop drawings for a process plant instrumentation system. The present invention accomplishes this objective.

As discussed above, every general type of loop component (e.g., transmitter, valve, etc.) has many component subtypes (e.g., flow valve, pressure valve), which in turn have many different specifications and manufacturers. There are hundreds or thousands of distinct components that may be used in a process plant. Each of these components has a number of different specifications or other information associated with it, such as temperature ratings, pressure ratings, frequencies, manufacturer's name, model numbers, materials, etc.

In the past, each such piece of information or specification associated with a loop component had to be separately input into a database. Each time a new component was specified, the information had to be input even if the same information had already been input for another component (e.g., materials; manufacturer's name; certain specifications). This inputting was typically performed by a human operator typing at a keyboard. This inputting task is partially redundant, consumes many man-hours of typing at a high labor coast, is inefficient, and causes delays.

It is therefore desirable to decrease the amount of component information that must be input by a human operator. The present invention accomplishes this result as well.

SUMMARY OF THE INVENTION

An improved process plant instrumentation design system is taught that dramatically reduces the amount of time, labor, and expense necessary to both design and draw instrument loop drawings, and to input the component information and specifications used in the instrument loops.

In accordance with the present invention, the inputting task is lessened by the creation of one or more default databases for certain predetermined instrumentation information and specifications. This default information may be preselected by the process plant owner or the instrumentation system designer. For example, it may include the name of a particular manufacturer for several types of instrumentation, or it may include the types of materials out of which the instrumentation is to be made.

When a piece of instrumentation is being specified, the information relating to that instrumentation is taken from the project databases and placed in a separate database. Then the appropriate information in the default database relating to that instrumentation is automatically transferred and applied to that instrument's database by editing either the default information or the other instrument information. Additional instrumentation information may be input. This instrumentation information is then used whenever that instrument's specifications or information are needed in a report.

In effect, a single piece of information from a default database is being automatically transferred to a large number of files. For example, if "brass" is specified as the material for every transmitter, the word "brass" will be automatically transferred to each of the one hundred or more transmitter specification files where a material needs to be specified. In the prior art, the word "brass" would be separately typed into each of these transmitter specification files by a human operator.

The default databases may be supplemented, revised, or edited at any time. This permits global changes to be made instead of changing each item separately as in the prior art.

The instrumentation design system according to the present invention also automatically creates, draws and prints the loop drawings. This is accomplished as follows.

The loop type and process type are selected by the operator. One of several loop subtypes is selected. The accessories to the loop (e.g. high alarm, low alarm), if any, are selected. These and other selections may be made by the operator using a menu-driven, "yes-no" selection method.

Once these selections are made, the system enters a fast-build mode. In this made, the loop is created by calling and running a particular software program module that is designed to build the specific loop that was selected. In a preferred embodiment, there is a unique program module for each combination of loop type, process type, and loop subtype. Each program module is preprogrammed to include certain types of components in the particular loop it is designed to build. The component types included within the loop created by any particular program module is dependent upon the nature of the selected loop.

The program module in turn calls a number of databases, each of which has specific information that will appear on the loop drawing created by the program. For example, a program module may call a database containing wiring numbers so that the wiring numbers may be placed on the loop drawing. The same program module may also call a field junction box database and a marshalling junction box database.

The loop may then be edited by adding or deleting components, component specifications, junction boxes, input/output devices, or wiring information.

After the loop has been built, the operator specifies the accessory components in the loop. The default specifications are used in conjunction with other, individualized specifications input by the operator to fully specify the loop's components.

Once the loop is completed and specified, the system automatically designs and prints a detailed drawing for each loop. This is done by transferred selected information relating to the loop and its components to an ASCII file. The ASCII file is then read by an AUTOLISP program. The AUTOLISP program in turn interfaces with a CAD program. The CAD program then generates or prints the loop drawing.

It is a feature of the present invention to use default information from a pre-existing default database wherever possible in order to greatly reduce the amount of data that must be input when designing a process plant instrumentation system.

It is another feature of the present invention to automatically create the loops required in a process plant instrumentation system by using a unique program module for each type of loop in conjunction with databases containing component specifications and other information.

It is yet another feature of the present invention to automatically generate the loop drawings for a process plant instrumentation system by interfacing a database management program containing data with a program that is capable of generating a graphical depiction of the loops.

It is yet another feature of the present invention to generate and print the loop drawings on an as needed basis instead of having to generate and store them in valuable memory space or other storage locations for later use.

These and other features of the present invention will be apparent to those skilled in the art by reference to the attached drawings and the following detailed description.

IN THE DRAWINGS

FIGS. 2a and 2b are sample Instrument Data Sheet reports generated by the system that list specifications for two electronic transmitters to be used in process plant loops for a hypothetical client, ABC Refining Company. FIG. 2c is a list of the Notes referenced in FIGS. 2a and 2b.

FIG. 3 is a sample Instrument Index Summary report generated by the system, listing component information for three exemplary loops (corresponding to loop drawing Nos. 25FC0001, 25PC0002, and 25FC0003) in a process plant project for the same hypothetical company, ABC Refining Company. The component listed in FIG. 2a is the second component listed in the first loop of FIG. 3, and the component listed in FIG. 2b is the second component listed in the third loop of FIG. 3.

Figure 4:
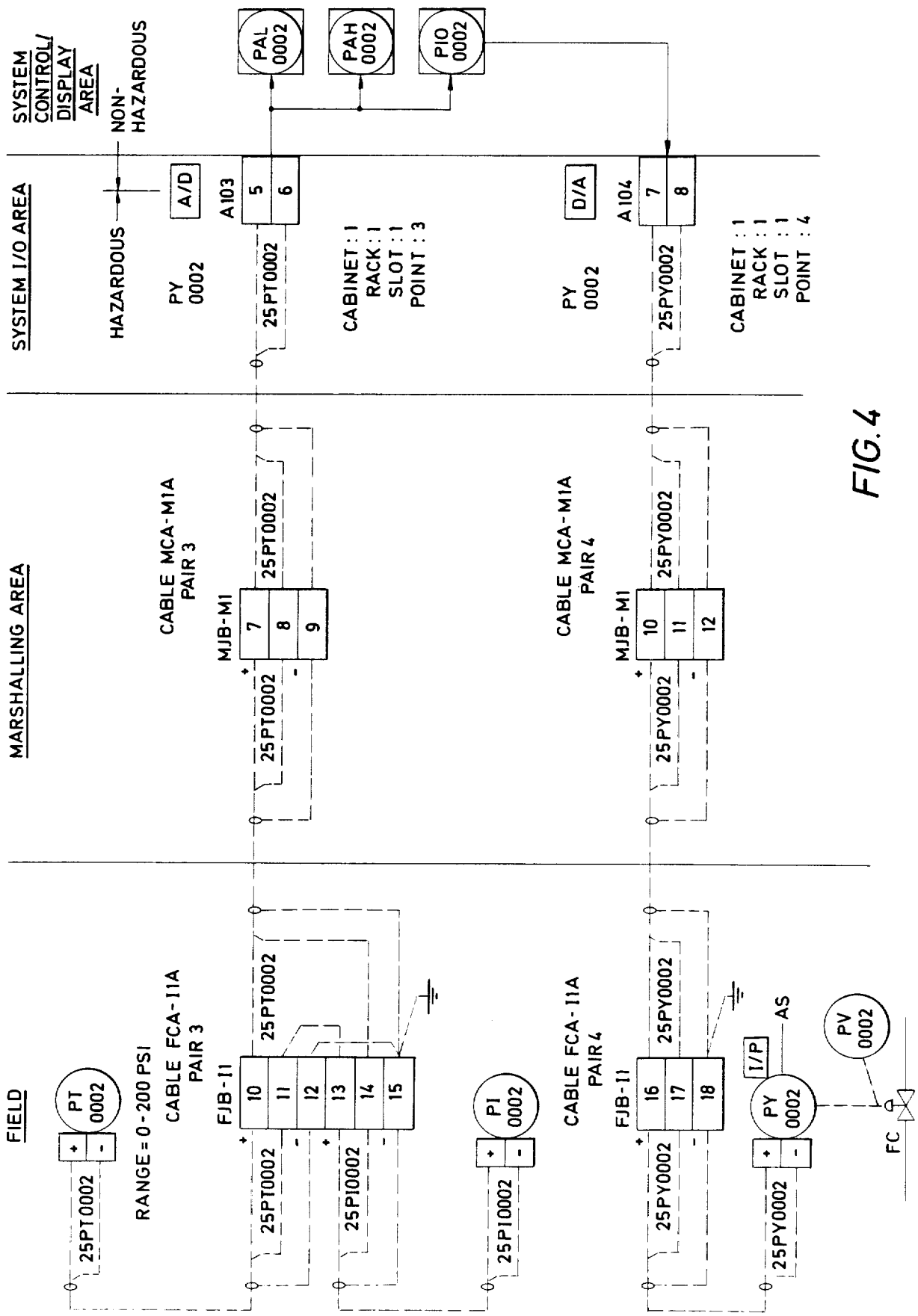

FIG. 4 is a sample loop drawing generated by the system for the same hypothetical client, ABC Refining Company. This loop drawing (No. 25PC0002) includes the components of the second loop listed in FIG. 3.

DETAILED DESCRIPTION

The instrument design system according to the present invention may be implemented using a software or firmware program as described below in combination with a microcomputer or a larger computer. One suitable microcomputer is an IBM-compatible computer having 1.0 megabytes of RAM memory, 40 megabytes of permanent memory space (e.g., a hard disk), a color monitor, a floppy disk drive, and a dot matrix printer.

Figure 1A:
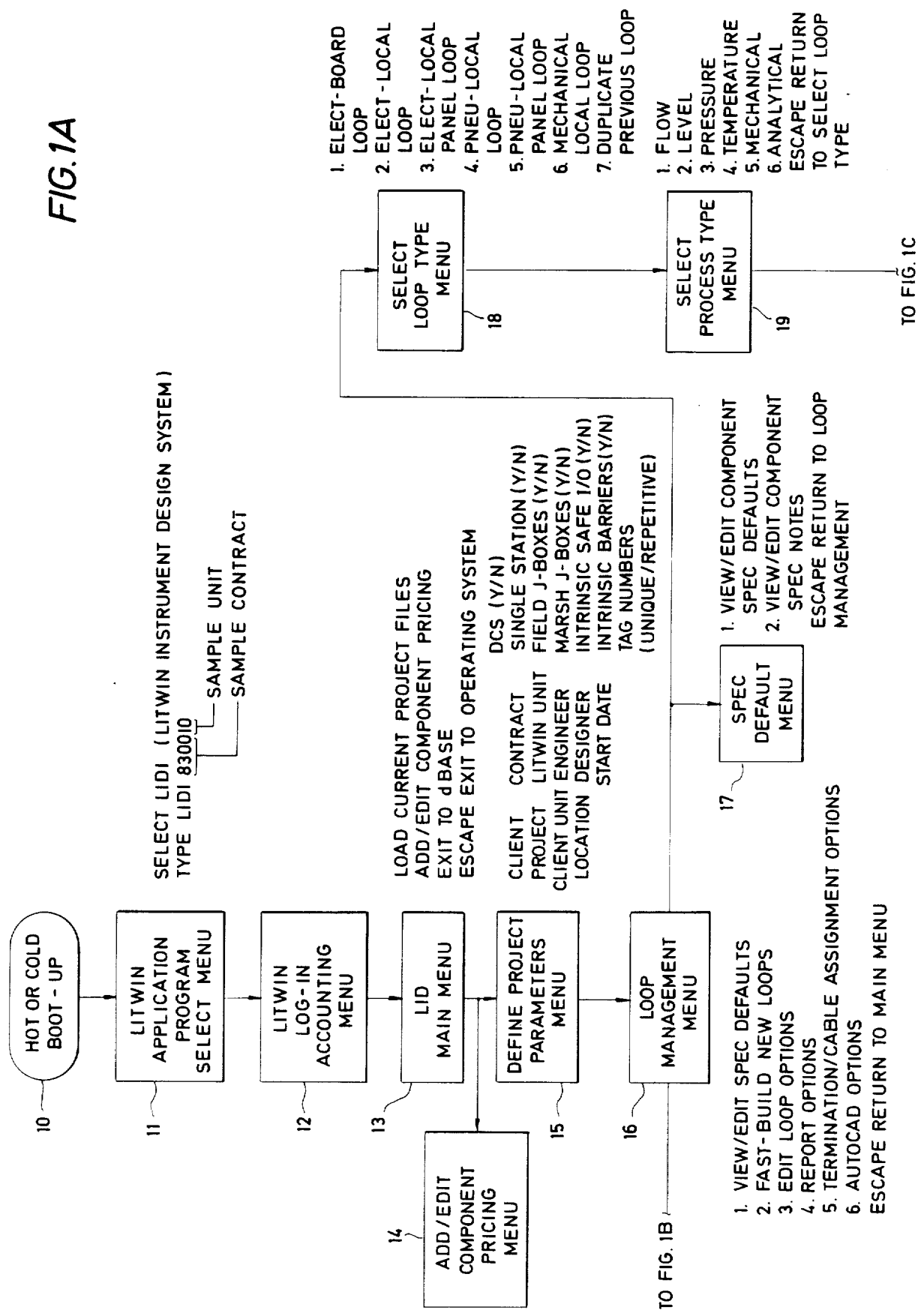
FIGS. 1A, 1B and 1C is a flow diagram of an instrumentation design system according to the present invention.
Figure 1B:
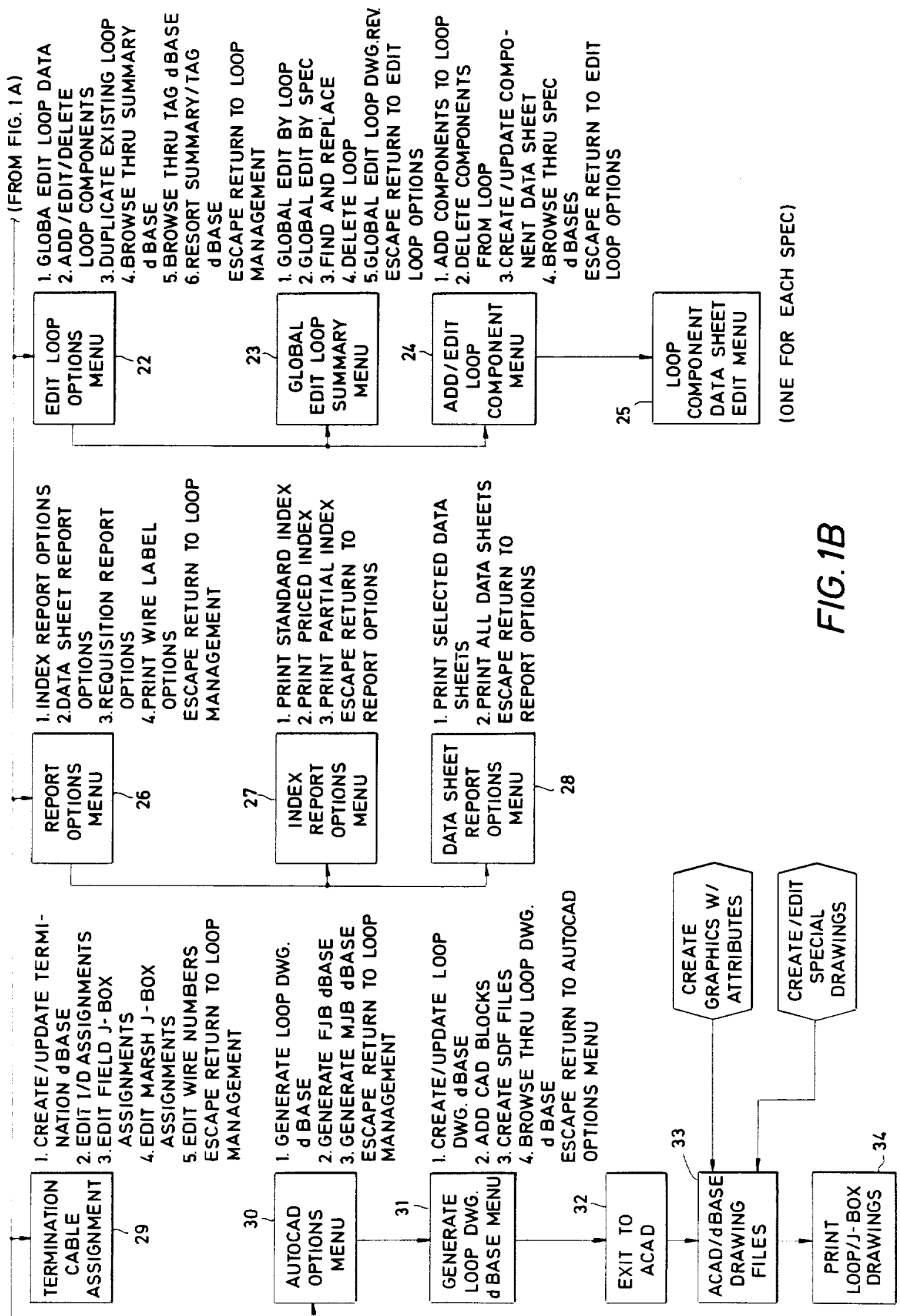
Figure 1C:
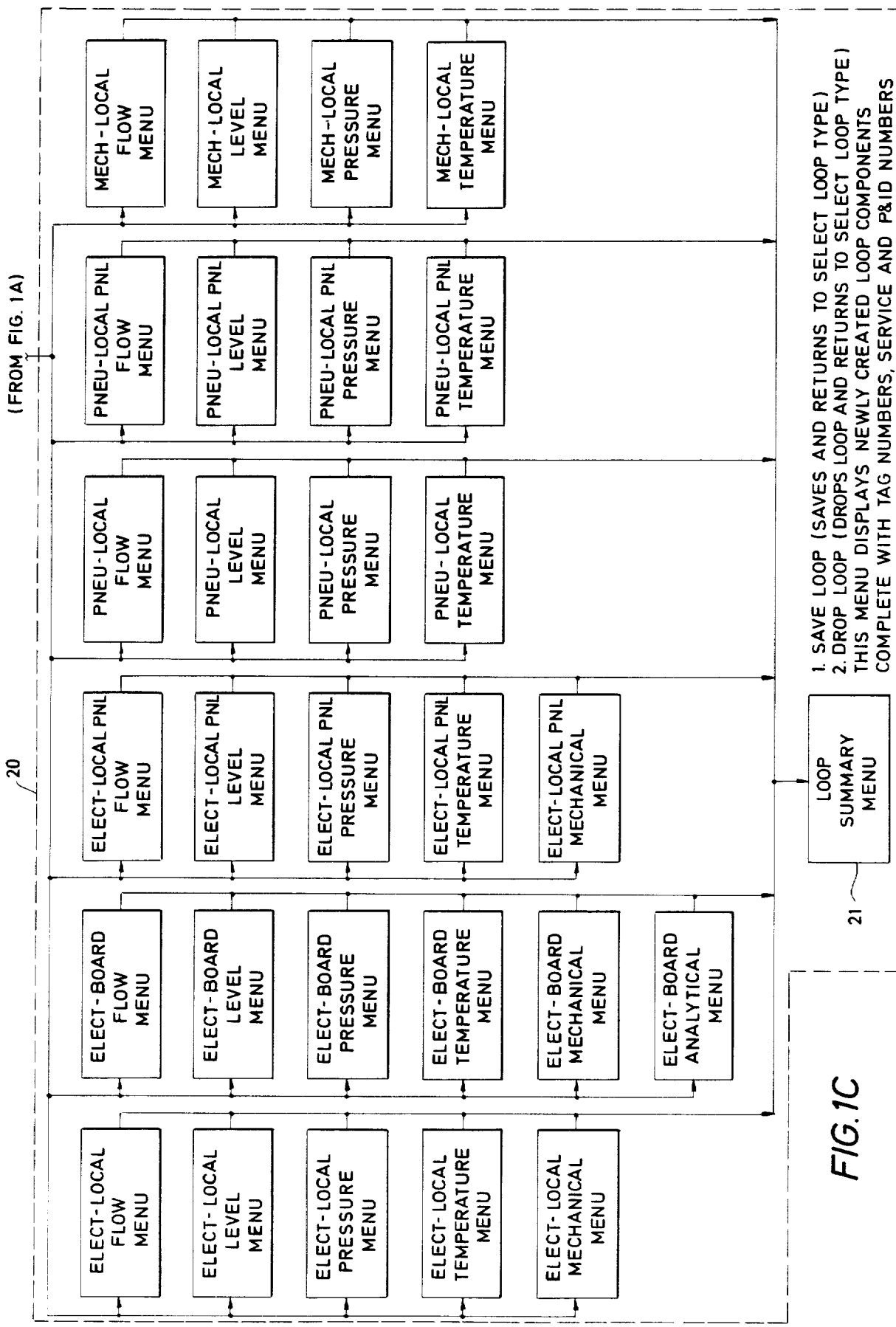

Referring now to FIG. 1, the software program that implements the instrument design system according to the present invention is booted at step 10. The operator selects the program at step 11, and logs in at step 12. The operator then sees a main menu 13 giving him the option to load a current or already created project file, to add or edit the pricing of components, to exit to the database, or exit to the disk operating system and out of the program altogether. If the operator chooses to add or edit the component pricing, he then sees a menu 14.

The project parameters for a new project are defined at project parameters menu 15. Here the operator receives a menu that prompts him for information on the new project, including the client's name, the contract number, the engineer, the designer's name, and the start date. Also at menu 15, the operator decides whether a distributive control system (DCS) will be used, whether the control system will be a single station type, whether field or marshalling junction boxes will be used in the loops, and makes other decisions as well.

The operator then sees loop management menu 16. Decisions made at loop management menu 16 determine which of several major branches will be taken in the program, namely whether:

1. to view or edit the default information for the component specifications at menu 17;
2. to fast build the new loops beginning at menu 18;
3. to go to the edit loop options branch in the program beginning at menu 22, enabling the operator to add or delete loop components or to change specifications;
4. to the report options branch beginning at menu 26, for printing various reports;
5. to the termination/cable assignment options branch at menu 29, in which information regarding input/output devices, field junction boxes, marshalling area junction boxes, and wire numbers are assigned;
6. to the AutoCad options branch beginning at menu 30, which generates the databases used in creating the loop drawings, and generates the loop drawings themselves; and
7. to return to loop management menu 16.

Assuming that the view/edit specification defaults option is chosen, a specification default menu 17 appears. At this point, the operator chooses to either view or edit the component specification defaults in the default database. For example, if the client specifies that only transmitters made by Acme Manufacturing Corporation are to be used, this information may be placed in the specification defaults at this point. The information need only be input one time since it will be sent to all the appropriate locations.

At menu 17, the operator may also view or edit any notes relating to the component specifications. Examples of such notes are found in FIG. 2c.

Once the specification defaults have been selected via menu 17, the fast-build new loops option may be chosen at loop management menu 16. The operator is then prompted to select the type of loop by a loop type menu 18.

In a preferred embodiment, there are six loop types that may be selected at menu 18:

1. Electronic-Board Loop. This is a loop using components where the decision-making is made by the distributive control system (DCS) or control board.
2. The Electronic-Local Loop. This is a loop using electronic components where the transmitter transmits a signal to a valve on location without passing it through the DCS or control board.
3. An Electronic-Local Panel Loop. This is a loop using electronic components where the transmitter sends a signal to a control panel located in the vicinity of the transmitter and valve, instead of to a centralized DCS or control board.
4. Pneumatic-Local Loop. This is a loop where the transmitter sends a signal that, in turn, controls an air signal.
5. Pneumatic-Local Panel Loop.
6. Mechanical-Local Loop. This is a loop which may include a mechanical device such as pressure gauge or safety valve.
7. The operator may also choose to duplicate the previous loop.

The choice of the loop type, as well as the process type discussed below, is dictated by the nature of the piping and instrument diagram (P&ID).

Once the loop type has been selected via menu 18, the type of process to be controlled is selected at process type menu 19. Examples of such processes include: fluid flow, fluid level, pressure, temperature, a mechanical process, or an analytical one.

Once the process type has been selected, the program enters its fast-build mode during which it builds the selected loop. The program calls a program module corresponding to the particular loop selected. Each program module is programmed to build a single loop type-process type combination. The program module is programmed to assemble the necessary components for that loop, as well as any accessory components (e.g., high or low alarms) which have been selected. Some exemplary loops that may be fast-built in this mode are listed in block 20 of FIG. 1.

The particular program module corresponding to the selected loop in turn calls a series of databases containing information relating to the components in that loop. These databases are preferably grouped by the type of component, so that, for example, information relating to field transmitters would preferably be included in a single field transmitter database.

Once the selected loop has been built, a summary of the newly created loop components, as well as certain information relating to those components, is displayed via loop summary menu 21. If the operator is satisfied with the listed components, he may save this loop, whereupon the program returns to loop type menu 18 so that another loop type may be selected for building. If the operator is not satisfied with the newly created loop, he may have it erased and return to loop type menu 18 to build another one.

After the loop contents have been accepted by the operator, the program returns to loop management menu 16. At this point, the operator typically chooses to proceed to edit loop options menu 22.

The operator has several options at menu 22: he may globally edit the loop or the specifications via global edit loop summary menu 23, he may proceed to menu 24 to add or edit the loop components, he may duplicate the existing loop, or browse through the database containing summary information, or through the database containing the designer's part numbers or tag numbers.

If global edit loop data option 23 is chosen via menu 22, the operator is presented with a menu enabling him to globally edit any information contained in a loop, as well as globally edit any information contained in the specification for a particular type of component. Also, particular information can be found by the system and replaced at menu 23, a loop may be entirely deleted, or the revision information for the loops may be globally edited.

A number of important options may be exercised at add/edit loop component menu 24. The operator may add components to the loop that were omitted, such as high alarm or low alarm indicators. Also, the operator may delete entire components from the loop.

The operator may also create or update the component data sheet information via menu 24. As indicated above, a default database is used to globally insert certain default information and specifications relating to particular components. However, not all information and specifications relating to the components may be added by using the default system since some of the component specifications are specific to a particular component. That specific information is added at this point via menu 25. The operator is presented with a screen and prompts asking him to insert information for each component's empty fields, e.g., pressure ratings, temperature ratings, materials, manufacturer names, or any other information that was not globally entered using the default database.

The default information for a particular component may also be changed at this point.

The data sheets for the loop components may also be edited at loop component data sheet edit menu 25. Examples of such data sheets are found in FIGS. 2a and 2b. FIG. 2c contains the notes referenced in FIGS. 2a and 2b.

The operator is then taken back to loop management menu 16, where he may choose the branch in the system that generates various reports. If this option is chosen, the operator is taken to report options menu 26. The type of reports that may be generated at this point include various indexes, component data sheets, requisitions, and wire labels.

If the index report option is chosen, the operator proceeds to an index report options menu 27, whereupon he may choose to print a standard index, an index containing prices, or a partial index. An example of a standard index is shown in FIG. 3.

FIG. 3 relates to a hypothetical client, ABC Refining Company, whose process plant requires three loops of instrumentation, corresponding to loop drawing numbers 25FC0001, 25PC0002, and 25FC0003. The components for each of the three loops are separately listed in FIG. 3, along with their tag numbers, their specification numbers, manufacturers, loop drawing numbers, and location.

The operator may also proceed to data sheet report options menu 28, which enables him to print selected data sheets, or all of the data sheets. Examples of data sheets for the hypothetical process plant client ABC Refining Company are shown in FIGS. 2a and 2b.

FIG. 2a is a hypothetical data sheet for a D/P cell transmitter, Tag (Part) No. 25-FT-0001. The transmitter described in FIG. 2a corresponds to the second device, Tag No. 25-FT-0001, of the first loop in FIG. 3.

The D/P cell transmitter described in FIG. 2b is similar to the transmitter described in FIG. 2a, but it has a different manufacturer and thus a different model number. Since so much information is common to both the transmitter in FIG. 2a and that of FIG. 2b, it is apparent that the common information could have been entered into the default database. This would obviate the necessity of otherwise typing in the information twice.

In this hypothetical process plant, there are only two such cell transmitters. In an actual process plant, there may be hundreds of such transmitters, all of which may share common information and specifications. This common information would be added, according to the present invention, by using the default database system as described above. This would obviously avoid a great deal of data input, thereby decreasing the time and expense involved in designing a process plant instrumentation system.

Referring again to FIG. 3, it is noted that all of the components in a particular loop have the same description under the heading "service", the same number under the heading "P&ID", as well as the same number under the heading "loop drawing". In the prior art, each of these items would have been separately input by a human operator for each of the components in a given loop. Using the present invention, however, this common information needs to be input only once for a given loop.

Referring again to FIG. 1, the design system sends the operator back to loop management menu 16 after the reports are printed via data sheet report options menu 28.

At this point, the operator may choose the termination/cable assignment option under menu 16, sending him to menu 29. The purpose of menu 29 and its options is to add the information that will be placed on the loop drawings relating to terminal numbers, wire numbers, assignments as to which wires are connected to which terminals in the field junction boxes, and the assignment of output terminals in the field junction boxes to the input terminals in the marshalling junction boxes.

A "field junction box" is a local electrical termination junction point designed to permit the connection of instrument pairs from a field instrument on a process line (pipe) into a single unit. A multi-pair cable from that field junction box may then be run to a marshalling area junction box or to the control house.

A "marshalling area junction box" is a junction box typically located in an area in the control house called the marshalling area, whose input terminals are connected to the output cables from the field junction box. The output cables from the marshalling area junction box are routed to the control system's input/output cabinets and terminate on input/output cards, or on printed circuit boards at the input/output level.

Information relating to the number of junction boxes in the loop, the types of junction boxes, the cable configuration, the number of cables, and the wire numbers may be input at termination/cable assignment menu 29. Some of this information may be input using a second default system.

For example, the program may have within it a default database for wire numbers. This default database may assign the wire numbers by knowing the particular device, its tag number, and the unit into which it will be connected. Since the program module for a particular loop type knows the order in which components within that loop will be connected, the default system uses that ordering information and the specific component specifications involved to determine the nature of wiring required to connect the two components.

Once all of the information has been input via menu 29, the program has all of the information needed to generate the loop drawings.

The operator typically then proceeds to AutoCad options menu 30, at which point the program creates certain databases in which information to be used on the loop drawings is collected.

After these databases have been generated, the operator is prompted by a generate loop drawing database menu 31 that allows him to create or update the loop drawing database.

The blocks or symbols from the computer-aided design (CAD) package are then added to the loop drawing database. Each component in a loop drawing, as well as the field and marshalling junction boxes, has a symbol associated with it in the CAD software package. These symbols are added to the loop drawing database at this point so that they may be included on the look drawings themselves.

The program then creates a series of temporary, ASCII files by translating the information from the loop drawing, field junction box, and marshalling junction box databases into a Standard Delineated File (SDF), written in ASCII code. These ASCII databases provide a link or a bridge between the database management portion of the program (the portion discussed above, preferably written in dBase III Plus), and the portion of the program that actually generates the drawings.

The ordering of the information in the ASCII files is very important, since the ASCII files are sequentially read by a software routine, written in AutoLisp computer language. This AutoLisp routine reads each record in an ASCII file line by line, places that information in appropriate AutoLisp files, and instructs the AutoCad program where to place the information on the loop drawing.

These AutoLisp files are read by the AutoCad program at step 33. The loop drawings, including some component specifications, the cad blocks, wiring, terminal, and other information, are then generated and displayed on the video screen. These drawings may then be printed at step 34 using the AutoCad package and any of a variety of commonly available printers.

The loop drawings may be stored as files and not printed, or printed at the time they are created.

FIG. 4 is a loop drawing of a hypothetical fuel gas pressure loop, loop drawing No. 25PC0002. The loop drawing of FIG. 4 corresponds to the second loop whose components are listed on FIG. 3.

Referring now to FIG. 4, it is noted that the loop drawing is divided into four major sections: field, marshalling area, system input/output area, and system control/display area. All of the components in the system control/display area may be software driven.

Referring to this upper left hand corner of the field section, the pressure transmitter PT0002 is connected via wire 25PT0002 to a field junction box FJB-I1. Note that the psi rating for the pressure transmitter is included on the loop drawing, as are the positive and negative terminals for the transmitter.

Field junction box FJB-I1 is depicted with its various junction points. The output of terminal 10 of FJB-I1 is connected by a cable type No. FCA-I1A to the positive terminal No. 7 of a marshalling junction box MJB-M1.

A pressure indicator PI0002 is also connected to field junction box FJB-I1. This pressure indicator may be mounted near pressure transmitter PT0002 so that an operator may determine, at a glance, the output of the pressure transmitter PT0002, and thereby know the desired setting for valve PV0002 (discussed below).

An output of MJB-M1 is connected via cable type No. MCA-M1A to an analog to digital converter A103 (an input/output device). The digital signal output by the A/D converter A103 is input to the software in the system control/display area.

It is noted in FIG. 4 that the loop drawing includes information that indicates in which cabinet, rack, slot, and point that the analog-to-digital converter is located in the system's input/output hardware. This information is input at the termination/cable assignment menu 29 of FIG. 1.

In this example, the signal is sent to a pressure indicator controller PI0002, as well as to a pressure alarm-low PAL0002 and a pressure alarm-high PAH0002. The purpose of these alarms is to provide notification that the input pressure is outside of the normal range.

The combination of the high and low pressure alarms, and the pressure indicator controller, is an example of a distributive control system (DCS) as discussed above. The CAD blocks or symbols for these devices include a square around a circle, indicating that it is a digital device in accordance with the ISA Standard.

The output of the pressure indicator controller PIC0002 is sent to a digital to analog converter A104 in the system input/output area as depicted in FIG. 4. The analog output signal from digital to analog converter A104 is transmitted via a cable type MCA-M1A to another marshalling junction box MJB-M1.

The output of marshalling junction box MJB-M1 is sent via a cable type number MCA-I1A to field junction box FJB-I1, for transmission to a current to pneumatic (I/P) transducer PY0002. This transducer converts the electrical signal to an air signal, since air is needed to drive the diaphragm on field control valve PV0002.

In a preferred embodiment, all of the information in a loop drawing (e.g., FIG. 4) is contained in a single ASCII file as discussed above. This ASCII file is comprised of a series of records, with each record corresponding to a component or device on the loop drawing. Included in a record for a device or component is the symbol for the device, any specifications to be printed on the loop drawing, the tag number, and the portion of the wiring extending from both sides (where applicable) of the device. For example, the record for the first field junction box FJB-I1 in FIG. 4 would include the tag number, the device number, the numbers for the junction points, the CAD block or picture of the device, as well as the wiring (dotted lines) on either side of the device. When the loop drawing is created, the wires for adjacent devices are placed so that they meet in a continuous line by using an x-y coordinate reference point.

It is apparent from the above summary and detailed description of a preferred embodiment that many changes could be made in the program or its organization while still utilizing the invention. These changes are still within the scope of the invention as described and claimed herein.

What is claimed is:

1. A method of creating a database of instrumentation information for use in designing a process plant instrumentation system, comprising:
    setting up at least one default database adapted to contain default instrumentation information;
    inputting at least one piece of default instrumentation information that is applicable to more than one piece of instrumentation;
    inputting additional instrumentation information; and
    editing said additional instrumentation information by supplementing or revising it with said default instrumentation information.

2. A method of creating a database of instrumentation information for use in designing a process plant instrumentation system, comprising:
    setting up at least one default database adapted to contain default instrumentation information;

inputting at least one piece of default instrumentation information that is applicable to more than one piece of instrumentation;

inputting additional instrumentation information; and editing said default instrumentation information by supplementing or revising it with said additional instrumentation information.

3. A method of creating and drawing an instrument loop for a process plant instrumentation system, comprising:

inputting instrumentation information;

selecting a particular instrument loop to be built, said loop containing particular instrumentation, comprising:

choosing the type of loop to be built;

choosing the type of process to be controlled;

assembling, into a loop database, at least some of said inputted instrumentation information relating to the particular instrumentation that is contained in said particular instrument loop; and drawing said particular instrument loop using at least some of said inputted instrumentation information contained in said loop database; and including the steps of translating at least some of the instrumentation information contained in said loop database into a computer code, placing said translated computer code information into one or more drawing files, reading said drawing file, interfacing a computer-aided design program with said drawing file, and using said computer-aided design program to draw said particular instrument loop.

4. A method of creating and drawing an instrument loop for a process plant instrumentation system, comprising:

inputting instrumentation information and storing said information in a first database;

building a particular instrument loop containing particular instrumentation, including:

choosing the type of loop to be built;

choosing the type of process to be controlled;

assembling, into a loop database, at least some of the information from said first computer database relating to said particular instrumentation that is contained in said particular instrument loop; and drawing the particular instrument loop using at least a portion of the information contained in said loop database, including the steps of translating at least some of the instrumentation information contained in said loop database into a computer code, placing said translated computer code information into one or more drawing files, reading said drawing file, interfacing a computer-aided design program with said drawing file, and using said computer-aided design program to draw said particular instrument loop.

5. A method of creating and drawing an instrument loop for a process plant instrumentation system, comprising:

inputting instrumentation information;

creating at least one program module adapted to assemble inputted instrumentation information relating to the instrumentation that may be contained in an instrument loop;

selecting a particular instrument loop to be built, including:

choosing the type of loop to be built;

choosing the type of process to be controlled;

running said program module to assemble at least some of said inputted instrumentation information relating to the particular instrumentation contained in said particular loop including calling one or more databases containing instrumentation information; and drawing said particular instrument loop using at least a portion of said assembled instrumentation information.

6. A method of creating and drawing an instrument loop for a process plant instrumentation system, comprising:

inputting instrumentation information;

creating a plurality of program modules, each of said modules being adapted to assemble the inputted instrumentation information relating to one or more loop type-process type combinations;

selecting a particular instrument loop to be built, including:

choosing the type of loop to be built;

choosing the type of process to be controlled;

selecting and running a particular program module adapted to assemble at least some of the inputted instrumentation information relating to said particular instrument loop including calling one or more databases containing instrumentation information; and drawing said particular instrument loop using at least a portion of said assembled instrumentation information.

7. A method of creating and drawing an instrument loop for a process plant instrumentation system, comprising:

inputting instrumentation information, and including the steps of setting up at least one default database adapted to contain default instrumentation information, inputting at least one piece of default instrumentation information that is applicable to more than one piece of instrumentation, inputting additional instrumentation information, and editing said default instrumentation information by supplementing or revising it with said additional instrumentation information;

selecting a particular instrument loop to be built, said loop containing particular instrumentation, comprising:

choosing the type of loop to be built;

choosing the type of process to be controlled;

assembling, into a loop database, at least some of said inputted instrumentation information relating to the particular instrumentation that is contained in said particular instrument loop; and drawing said particular instrument loop using at least some of said inputted instrumentation information contained in said loop database.

8. A method of creating and drawing an instrument loop for a process plant instrumentation system, comprising:

inputting instrumentation information and storing said information in a first database, including the steps of
   setting up at least one default database adapted to contain default instrumentation information,
   inputting at least one piece of default instrumentation information that is applicable to more than one piece of instrumentation,
   inputting additional instrumentation information, and
   editing said default instrumentation information by supplementing or revising it with said additional instrumentation information;
building a particular instrument loop containing particular instrumentation, including:
   choosing the type of loop to be built;
   choosing the type of process to be controlled;
   assembling, into a loop database, at least some of the information from said first computer database relating to said particular instrumentation that is contained in said particular instrument loop; and
   drawing the particular instrument loop using at least a portion of the information contained in said loop database.

9. A method of creating and drawing an instrument loop for a process plant instrumentation system, comprising:
   inputting instrumentation information, including the steps of
      setting up at least one default database adapted to contain default instrumentation information,
      inputting at least one piece of default instrumentation information that is applicable to more than one piece of instrumentation,
      inputting additional instrumentation information, and
      editing said default instrumentation information by supplementing or revising it with said additional instrumentation information;
   creating at least one program module adapted to assemble inputted instrumentation information relating to the instrumentation that may be contained in an instrument loop;
   selecting a particular instrument loop to be built, including:
      choosing the type of loop to be built;
      choosing the type of process to be controlled;
   running said program module to assemble at least some of said inputted instrumentation information relating to the particular instrumentation contained in said particular loop; and
   drawing said particular instrument loop using at least a portion of said assembled instrumentation information.

10. A method of creating and drawing an instrument loop for a process plant instrumentation system, comprising:
   inputting instrumentation information, including the steps of
      setting up at least one default database adapted to contain default instrumentation information,
      inputting at least one piece of default instrumentation information that is applicable to more than one piece of instrumentation,
      inputting additional instrumentation information, and
      editing said default instrumentation information by supplementing or revising it with said additional instrumentation information;
   creating a plurality of program modules, each of said modules being adapted to assemble the inputted instrumentation information relating to one or more loop type-process type combinations;
   selecting a particular instrument loop to be built, including:
      choosing the type of loop to be built;
      choosing the type of process to be controlled;
   selecting and running a particular program module adapted to assemble at least some of the inputted instrumentation information relating to said particular instrument loop; and
   drawing said particular instrument loop using at least a portion of said assembled instrumentation information.

11. A method of creating and drawing an instrument loop for a process plant instrumentation system, comprising:
   inputting instrumentation information, including the steps of
      setting up at least one default database adapted to contain default instrumentation information,
      inputting at least one piece of default instrumentation information that is applicable to more than one piece of instrumentation,
      inputting additional instrumentation information, and
      editing said additional instrumentation information by supplementing or revising it with said default instrumentation information;
   selecting a particular instrument loop to be built, said loop containing particular instrumentation, comprising:
      choosing the type of loop to be built;
      choosing the type of process to be controlled;
   assembling, into a loop database, at least some of said inputted instrumentation information relating to the particular instrumentation that is contained in said particular instrument loop; and
   drawing said particular instrument loop using at least some of said inputted instrumentation information contained in said loop database.

12. A method of creating and drawing an instrument loop for a process plant instrumentation system, comprising:
   inputting instrumentation information and storing said information in a first database, including the steps of
      setting up at least one default database adapted to contain default instrumentation information,
      inputting at least one piece of default instrumentation information that is applicable to more than one piece of instrumentation,
      inputting additional instrumentation information, and
      editing said additional instrumentation information by supplementing or revising it with said default instrumentation information;
   building a particular instrument loop containing particular instrumentation, including:
      choosing the type of loop to be built;
      choosing the type of process to be controlled;
      assembling, into a loop database, at least some of the information from said first computer database relating to said particular instrumentation that is contained in said particular instrument loop; and drawing the particular instrument loop using at least a portion of the information contained in said loop database.

13. A method of creating and drawing an instrument loop for a process plant instrumentation system, comprising:

inputting instrumentation information, including the steps of
setting up at least one default database adapted to contain default instrumentation information,
inputting at least one piece of default instrumentation information that is applicable to more than one piece of instrumentation,
inputting additional instrumentation information, and
editing said additional instrumentation information by supplementing or revising it with said default instrumentation information;

creating at least one program module adapted to assemble inputted instrumentation information relating to the instrumentation that may be contained in an instrument loop;

selecting a particular instrument loop to be built, including:
choosing the type of loop to be built;
choosing the type of process to be controlled;

running said program module to assemble at least some of said inputted instrumentation information relating to the particular instrumentation contained in said particular loop; and drawing said particular instrument loop using at least a portion of said assembled instrumentation information.

14. A method of creating and drawing an instrument loop for a process plant instrumentation system, comprising:

inputting instrumentation information, including the steps of
setting up at least one default database adapted to contain default instrumentation information,
inputting at least one piece of default instrumentation information that is applicable to more than one piece of instrumentation,
inputting additional instrumentation information, and
editing said additional instrumentation information by supplementing or revising it with said default instrumentation information;

creating a plurality of program modules, each of said modules being adapted to assemble the inputted instrumentation information relating to one or more loop type-process type combinations;

selecting a particular instrument loop to be built, including:
choosing the type of loop to be built;
choosing the type of process to be controlled;

selecting and running a particular program module adapted to assemble at least some of the inputted instrumentation information relating to said particular instrument loop; and drawing said particular instrument loop using at least a portion of said assembled instrumentation information.

* * * * *